United States Patent
Ross

[19]

[11] Patent Number: 5,890,759
[45] Date of Patent: Apr. 6, 1999

[54] FREE FLOATING SUSPENSION APPARATUS FOR A CHILD'S BICYCLE SEAT

[76] Inventor: David B. Ross, 210 Amory St., Jamaica Plain, Mass. 02130

[21] Appl. No.: 853,153

[22] Filed: May 8, 1997

[51] Int. Cl.$^6$ ................................................. B62J 1/12
[52] U.S. Cl. ..................... 297/195.13; 297/243; 280/202
[58] Field of Search .............................. 297/195.13, 243, 297/452.39; 472/110, 135; 280/202

[56] References Cited

U.S. PATENT DOCUMENTS

| | | | |
|---|---|---|---|
| 1,527,015 | 2/1925 | Sedlacek | 472/110 |
| 2,635,675 | 4/1953 | Buck | 472/110 X |
| 4,051,985 | 10/1977 | Berger | 297/243 X |
| 4,226,411 | 10/1980 | Manus | 472/110 |
| 5,529,325 | 6/1996 | Glog et al. | 280/202 |
| 5,653,500 | 8/1997 | Amore | 297/195.13 |

FOREIGN PATENT DOCUMENTS

| | | | |
|---|---|---|---|
| 19536 | 11/1914 | Denmark | 280/202 |
| 616347 | 1/1927 | France | 280/202 |
| 66187 | 3/1950 | Netherlands | 280/202 |
| 678044 | 8/1952 | United Kingdom | 280/202 |

*Primary Examiner*—Peter R. Brown
*Attorney, Agent, or Firm*—Hale and Dorr LLP

[57] ABSTRACT

A child bicycle seat and suspension apparatus has a housing that connects to a bicycle frame only at a seat post. The child seat is mounted to a suspended swing-arm connected to the housing at a fulcrum point for motion in the vertical axis. Torque converting levers are connected to the swing-arm assembly, and a horizontal adjustable shock is connected to the levers and to the housing.

17 Claims, 1 Drawing Sheet

5,890,759

FREE FLOATING SUSPENSION APPARATUS FOR A CHILD'S BICYCLE SEAT

BACKGROUND OF THE INVENTION

This invention relates to bicycle seats.

Child seats designed for carrying children with a bicycle typically have a rigid auxiliary frame that attaches to a rear wheel axle and to the frame of the bicycle. Such designs, however, have several disadvantages. One drawback is that such child seats lack shock absorption to cushion the ride, and therefore there is a risk of harm to the child. Another drawback is that it is inconvenient to assemble and disassemble such a child seat with respect to the bicycle, and therefore it is time-consuming to transfer the child seat to another bicycle.

SUMMARY OF THE INVENTION

An object of the present invention is to provide a child seat for a bicycle with an adjustable suspension apparatus to improve safety and comfort for the child.

Another object is to provide for a child seat for a bicycle, a suspension apparatus that can be quickly mounted and dismounted for use.

The invention includes a child seat that can be mounted on a bicycle with a free-floating suspension apparatus. The suspension apparatus is preferably connected to a seat post used to support the bicycle seat. The suspension apparatus preferably has a housing rigidly connected to the seat post, and a swing-arm assembly connected to the child seat and pivotally coupled to the housing for vertical pivoting movement. A horizontally-oriented shock absorber absorbs shocks from the pivoting motion between the housing and the swing-arm assembly.

In another aspect, the invention includes a child's bicycle seat with a suspension apparatus that is easy to assemble and disassemble with respect to a bicycle. The child seat is connected to a suspension apparatus, which is connected only to a tube that is used to support the bicycle seat. The suspension apparatus can be permanently connected to the tube so that the tube, suspension apparatus, and seat are removable and attachable as an integral unit.

In yet another aspect, the invention includes a bicycle that has a frame, a bicycle seat, a seat post connecting the bicycle seat to the frame, a child seat, and a suspension apparatus connected between the child seat and the seat post, such that the suspension apparatus is preferably connected only to the seat post so that it is essentially free-floating.

The suspension apparatus of the present invention has a number of advantages. The suspension apparatus improves the level of safety and the smoothness of the ride compared to child seats that are attached to a rear wheel axle, and allows the bicyclist to encounter variations in terrain while reducing the risk of sudden jarring that could otherwise cause a child to bite his or her tongue, to fall from the seat, or to get spinal disjunctions. The suspension apparatus has a shock absorber that is adjustable. By simply unlocking or unbolting a seat post clamp, the entire unit can be transferred to another bicycle frame quickly and conveniently. Other features and advantages will become apparent from the following detailed description, drawings, and claims.

DETAILED DESCRIPTION

Figure 1:
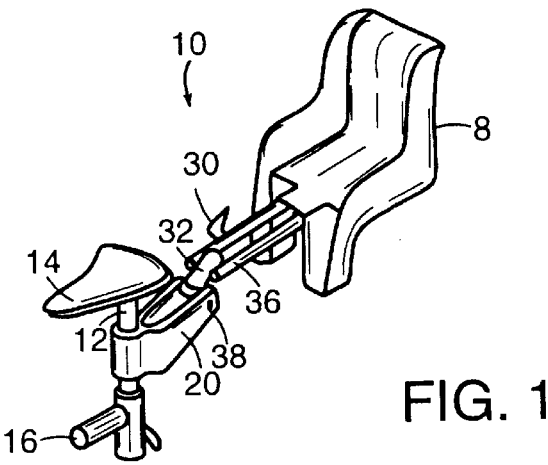
FIG. 1 is a perspective view of a child seat and a suspension apparatus according to the present invention, shown mounted to a bicycle frame.

Referring to FIG. 1, a child seat 8 for use with a bicycle is connected to a free floating suspension apparatus 10. The suspension apparatus is connected to a seat post 12 that couples supports bicycle seat 14 over a bicycle frame 16 (note that most of the frame has been omitted here). Suspension apparatus 10 has a housing 20 that is fitted onto post 12 and rigidly secured, preferably with welds at the top and bottom of housing 20. Post 12 preferably is either solid, or is made with a thick wall (thicker than a typical seat post) to handle the torque during loading. Apparatus 10 also has a swing-arm assembly 30 that preferably includes two aluminum tubes 36 rigidly connected at one end to seat 8, and welded at another end to a solid aluminum neck 32. Neck 32 is pivotally connected to housing 20 at a pivot point 38.

Figure 2:
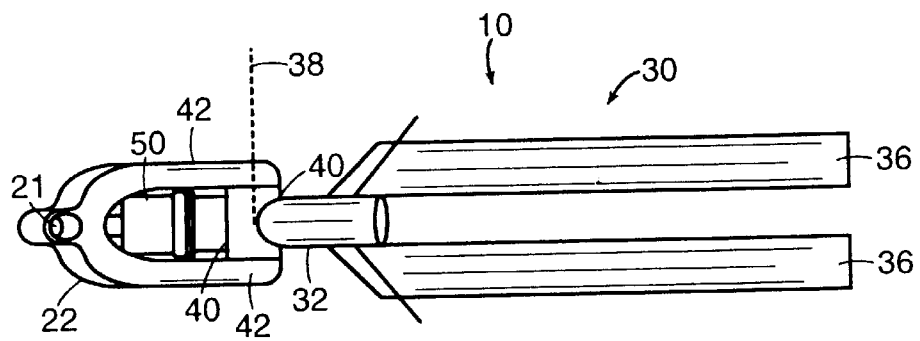
FIGS. 2 and 3 are top and side views of the apparatus of FIG. 1, shown without the seats.
Figure 3:
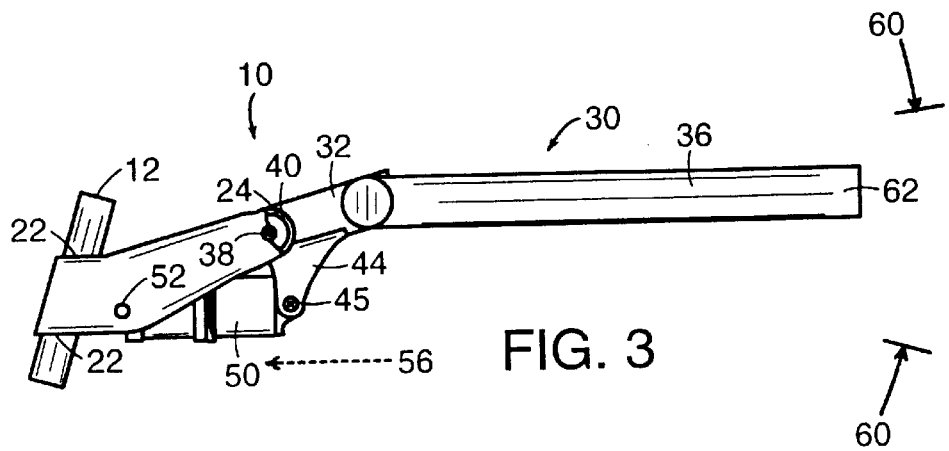
Figure 4:
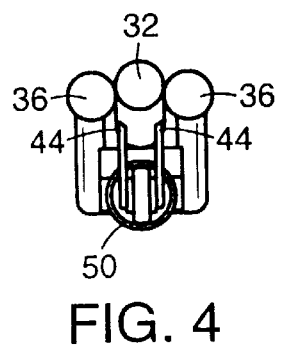
FIG. 4 is a cross-sectional view of the apparatus of FIG. 3.

Referring also to FIGS. 2, 3 and 4, suspension apparatus 10 is shown in more detail. Housing 20 has a rounded forward portion with an opening 21 for receiving a seat post 12. At the other end of housing 20 are two parallel, spaced apart, rearwardly extending arms 42. Bearings 24 are press fit into each of arms 42. A fulcrum shaft housing 40 houses shaft bearings 24. The bearings should be tight, high precision bearings, such as ABEC 5 bearings used for in-line skates.

Neck 32 is welded to shaft housing 40 and also to two roughly triangular torque converting levers 44, each of which has one side welded to the neck and a corner 45 remote from the neck.

A shock absorber 50 is mounted to housing 20 under and between arms 42 at a lower fixed point 52 on housing 20. Shock absorber 50 is attached at another end to levers 44 at remote corners 45 to allow compression and expansion along an axis 56 due to vertical pivoting by the neck relative to the housing as indicated by arrows 60.

When in use, a child in seat 8 loads the free floating suspension apparatus to a level point indicated at line 62, allowing for movement along the direction of arrows 60. The air actuated shock absorber operates with air pressure that can be adjusted for the weight of the passenger and the degree of terrain encountered.

The child's seat and suspension apparatus can be easily connected to the bicycle and removed from the bicycle by simply unlocking or unbolting seat post 12. As noted above, the housing is preferably rigidly welded to a seat post, and therefore the housing and seat post are attachable and removable together as a unit. Alternatively, the housing can be removably attached to and removed from the seat post as long as the housing can be rigidly secured to the seat post.

While the term "bicycle" literally suggests two wheels, it is generally used here to apply to a human foot-powered cycle that could have additional wheels for stability, or to a cycle for more than one operator (e.g., bicycle built for two).

While there has been shown and described an embodiment of the present invention, it should be understood that any changes can be made without departing from the scope of the invention. The various shafts and tubes can each be made hollow or solid

What is claimed is:

1. An apparatus comprising: a bicycle having a bicycle seat;

a seat post for supporting the bicycle seat;

a child seat;

a bracket rigidly connected to the seat post;

an arm assembly including an arm connected to the child seat, the arm assembly pivotally connected to the bracket for pivoting in a vertical plane; and a shock absorber connected between the bracket and the arm assembly for absorbing the pivoting motion of the arm assembly.

2. The apparatus of claim 1, wherein the connection between the bracket and the seat post is the sole support for the child seat with respect to the bicycle.

3. The apparatus of claim 1, wherein the shock absorber operates with fluid pressure that is adjustable in response to the load in the child seat.

4. The apparatus of claim 1, wherein the bracket has two spaced arms, a bearing, and a bearing housing for housing the bearing, the bearing housing extending from one arm of the bracket to another arm of the bracket.

5. The apparatus of claim 4, wherein the arm assembly includes a neck around the bearing housing, at lest one arm connected to the next and the child seat, and a lever extending downwardly from the neck and connected to the shock absorber.

6. A child seat and suspension apparatus for connection to an object, the apparatus comprising:

a child seat;

a bracket for connection to the object, the bracket having two spaced arms, a bearing, and a bearing housing for housing the bearing and extending from one arm of the bracket to another arm of the bracket;

an arm assembly connected to the child seat and pivotally connected to the bracket for pivoting in a vertical plane, wherein the arm assembly has an arm connected to the child seat, a neck rigidly connected to the bearing housing and to the arm and at least one lever rigidly connected to and extending away from the neck; and a shock absorber connected between the housing and the lever of the arm assembly for absorbing the pivoting motion of the arm assembly relative to the bracket.

7. A bicycle comprising:

a seat for the bicycle operator;

a seat post for supporting the seat;

a passenger seat; and a suspension apparatus connected to the passenger seat and connected to the bicycle only at the seat post, wherein the suspension apparatus includes a first member connected to the passenger seat, a second member connected to the seat post, the first and second members being pivotally connected, and a shock absorber connected between the first and second members to absorb the pivoting motion.

8. The bicycle of claim 7, wherein the suspension apparatus is capable of supporting the weight of a child.

9. The bicycle of claim 8, wherein the suspension apparatus includes a first member connected to the child seat and a second member connected to the seat post, the first and second members being pivotally connected.

10. A child seat and suspension apparatus used with a bicycle, the apparatus comprising:

a child seat;

a bracket for connection to the bicycle;

an arm assembly having at least one arm extending horizontally and connected to the child seat and pivotally connected to the bracket, the arm assembly including a lever extending downwardly; and a shock absorber connected between the bracket and the lever, the absorber being oriented horizontally and located under the bracket and the arm assembly.

11. A child seat and suspension for connection to a bicycle, the apparatus comprising:

a child seat;

a bracket having an end configured for rigid connection to a tubular member of the bicycle;

an arm assembly including an arm connected to the child seat, the arm assembly pivotally connected to the bracket for pivoting in a vertical plane when the apparatus is connected to a bicycle; and a shock absorber connected between the bracket and the arm assembly for absorbing the pivoting motion of the arm assembly, wherein the arm of the arm assembly and the shock absorber are horizontally oriented when the apparatus is connected to a bicycle.

12. A bicycle comprising:

a bicycle seat for a bicycle operator;

a seat post rigidly connected directly to the bicycle seat;

a child seat for supporting a child;

a suspension apparatus including a bracket and at least one arm connected to the child seat and to the bracket, wherein the bracket and the arm are pivotally connected for movement in a plane; and a shock absorber connected between the bracket and the arm for absorbing the pivoting motion of the arm assembly.

13. The apparatus of claim 12, wherein the shock absorber includes an air actuated piston.

14. The apparatus of claim 12, wherein the suspension apparatus has two arms in parallel connected to the seat and to the bracket.

15. The bicycle of claim 12, wherein the shock absorber includes a piston for receiving a fluid.

16. An apparatus comprising:

a bicycle having a bicycle seat;

a child seat;

a bracket connected to the bicycle at a location under the bicycle seat;

an arm assembly connected to the child seat and pivotally connected to the bracket to allow the arm assembly to pivot in the vertical plan, the arm assembly including an arm extending horizontally away from the bracket; and a horizontally-oriented shock absorber connected between the bracket and the arm.

17. The apparatus of claim 16, wherein the bicycle has seat post for supporting the seat, the bracket connected to the seat post.

* * * * *